United States Patent
Li et al.

(10) Patent No.: US 12,557,023 B2
(45) Date of Patent: Feb. 17, 2026

(54) POWER CONSUMPTION CONTROL METHOD AND WIRELESS LOCAL AREA NETWORK COMMUNICATION APPARATUS

(71) Applicant: HUAWEI TECHNOLOGIES CO., LTD., Guangdong (CN)

(72) Inventors: Weihua Li, Shanghai (CN); Shuqi Wang, Shanghai (CN); Xiaofeng He, Shenzhen (CN); Yanjie Gu, Shenzhen (CN); Wei Khuen Chan, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 18/372,848

(22) Filed: Sep. 26, 2023

(65) Prior Publication Data
US 2024/0031935 A1    Jan. 25, 2024

Related U.S. Application Data (63) Continuation of application No. PCT/CN2021/083609, filed on Mar. 29, 2021.

(51) Int. Cl.
*H04W 52/02*     (2009.01)
*H04W 84/12*     (2009.01)

(52) U.S. Cl.
CPC ........ *H04W 52/0235* (2013.01); *H04W 84/12* (2013.01)

(58) Field of Classification Search
CPC ......... H04W 52/0209; H04W 52/0235; H04W 52/0245; H04W 52/225; H04W 84/12; H04W 76/20; H04W 52/0258; H04L 5/001; Y02D 30/70
See application file for complete search history.

(56) References Cited

U.S. PATENT DOCUMENTS

| | | | | |
|---|---|---|---|---|
| 6,311,048 B1 * | 10/2001 | Loke | ...................... | H04B 1/109 455/343.2 |
| 6,611,679 B1 * | 8/2003 | Park | ...................... | H04B 1/109 330/278 |
| 6,801,760 B2 * | 10/2004 | Hutchison | ............... | H04B 1/109 455/343.2 |
| 7,010,270 B1 * | 3/2006 | Thomas | ................. | H04B 1/406 455/552.1 |
| 7,283,851 B2 * | 10/2007 | Persico | ............. | H04W 52/0254 455/343.1 |
| 7,660,327 B2 * | 2/2010 | Katar | .................... | H04L 12/413 370/461 |

(Continued)

FOREIGN PATENT DOCUMENTS

WO     WO-0018023 A1 *     3/2000    ............. H04B 1/109

*Primary Examiner* — Jae Y Lee
(74) *Attorney, Agent, or Firm* — WOMBLE BOND DICKINSON (US) LLP (57) ABSTRACT

Embodiments of this application provide a WLAN communication apparatus and a control method. The method includes: adjusting power consumption of an external LNA based on a WLAN signal, to dynamically adjust the power consumption of the external LNA based on an actual requirement, so that the power consumption of the external LNA is reduced while a service requirement is ensured, and further, overall power consumption of a device is reduced.

15 Claims, 5 Drawing Sheets

(56) References Cited

U.S. PATENT DOCUMENTS

| | | | | |
|---|---|---|---|---|
| 7,787,850 B2* | 8/2010 | Rofougaran | H04W 52/52 | 455/245.2 |
| 7,907,555 B1* | 3/2011 | Sankabathula | H04B 17/318 | 370/284 |
| 7,916,711 B2* | 3/2011 | Waxman | H04H 20/42 | 370/347 |
| 7,983,365 B2* | 7/2011 | Bhat | H03F 3/19 | 375/345 |
| 8,199,769 B2* | 6/2012 | Arad | H04L 5/22 | 370/459 |
| 8,238,852 B2* | 8/2012 | Rofougaran | H04W 52/0245 | 455/127.1 |
| 8,299,949 B2* | 10/2012 | Rofougaran | H03M 1/186 | 341/125 |
| 8,594,601 B2* | 11/2013 | Rofougaran | H03F 1/34 | 455/343.1 |
| 8,811,929 B2* | 8/2014 | Hendrix | H03G 3/20 | 455/343.1 |
| 8,849,226 B2* | 9/2014 | Bruchner | H04B 1/40 | 455/190.1 |
| 8,923,780 B2* | 12/2014 | Ojo | H04B 1/406 | 455/73 |
| 2007/0223626 A1* | 9/2007 | Waxman | H04W 52/0245 | 375/316 |
| 2009/0061798 A1* | 3/2009 | Rofougaran | H04W 52/0245 | 455/127.2 |
| 2012/0270506 A1* | 10/2012 | Rofougaran | H04W 52/52 | 455/69 |
| 2014/0301259 A1* | 10/2014 | Homchaudhuri | H04W 52/029 | 370/311 |
| 2014/0301262 A1* | 10/2014 | Homchaudhuri | H04W 52/0216 | 370/311 |
| 2019/0007941 A1* | 1/2019 | Cavalcanti | H04B 7/2656 | |
| 2019/0182894 A1* | 6/2019 | Huang | H04B 7/0413 | |
| 2023/0247562 A1* | 8/2023 | Takata | H04W 52/16 | 370/311 |

* cited by examiner

FIG. 1

-- Prior Art --

POWER CONSUMPTION CONTROL METHOD AND WIRELESS LOCAL AREA NETWORK COMMUNICATION APPARATUS

CROSS-REFERENCE TO RELATED APPLICATIONS

This application is a continuation of International Application No. PCT/CN2021/083609, filed on Mar. 29, 2021, the disclosure of which is hereby incorporated by reference in its entirety.

TECHNICAL FIELD

Embodiments of this application relate to the communication field, and in particular, to a power consumption control method and a wireless local area network communication apparatus.

BACKGROUND

With the development of communication technologies, a wireless local area network (WLAN) technology, for example, a wireless fidelity (Wi-Fi) network, is increasingly widely applied. Currently, electronic devices having a Wi-Fi function include a mobile phone, a wearable device, a television, and the like. Generally, a distance between a Wi-Fi chip in an electronic device and an antenna feedpoint is long. To improve receiving sensitivity and output power, a radio frequency front-end module (FEM) is disposed between the Wi-Fi chip and the antenna. The radio frequency front-end module includes but is not limited to components such as a power amplifier and a low noise amplifier (LNA). When the LNA works, power consumption of the radio frequency front-end module is high, which increases power consumption of the entire Wi-Fi system and the electronic device.

SUMMARY

To resolve the foregoing technical problem, this application proposes a WLAN apparatus, a chip, and a power consumption control method, so that power of an LNA of a radio frequency front-end module can be controlled based on an actual requirement, and further, power consumption of a device is effectively reduced and resource utilization is improved.

According to a first aspect, an embodiment of this application provides a WLAN apparatus. The apparatus includes a radio frequency front-end module and a processing circuit. The radio frequency front-end module includes a low noise amplifier LNA. The LNA is coupled to an antenna, and is configured to: receive a first WLAN signal from the antenna, and perform gain amplification on the first WLAN signal to obtain a second WLAN signal. The processing circuit is coupled to the LNA, and is configured to receive the second WLAN signal, and the processing circuit adjusts a power consumption mode of the LNA based on the second WLAN signal. In this way, the apparatus in this embodiment of this application may dynamically adjust power consumption of the LNA in the radio frequency front-end module based on the received WLAN signal, so that the power consumption of the LNA can be configured based on an actual requirement, and further, overall power consumption of a device is effectively reduced and resource utilization is improved.

For example, the WLAN apparatus in this embodiment of this application may support the 802.11 protocol. For example, the WLAN signal may be a Wi-Fi signal.

For example, the apparatus may adjust the power consumption of the LNA based on a frame type of the WLAN signal. For example, frames of different frame types have different sensitivity to environment interference in a transmission process. For example, for a frame type with poor capabilities of anti-interference and anti-noise, the type of signal frame is sensitive to environment interference, to be specific, easily affected by the environment interference. The apparatus in this embodiment of this application may adjust the external LNA in the radio frequency front-end module to a high power consumption mode, to receive a signal frame of this type, so as to improve a receiving capability of a receive end, so that the apparatus can correctly receive the signal frame.

For example, for a frame type with strong capabilities of anti-interference and anti-noise, and/or insensitive to a latency, the apparatus in this embodiment of this application may adjust the external LNA to a low power consumption mode, to reduce the power consumption of the external LNA while ensuring service performance, so that power consumption of the radio frequency front-end module is reduced, and further, overall power consumption of the apparatus is reduced.

For example, the radio frequency front-end module may be disposed close to an end of the antenna.

For example, the radio frequency front-end module and the processing circuit are located in different chips.

For example, the radio frequency front-end module includes a receiving circuit, a sending circuit, and a switching switch. The switching switch may be configured to switch the receiving circuit and the sending circuit in response to a control signal of the processing circuit.

For example, the receiving circuit of the radio frequency front-end module may include a bypass circuit. The bypass circuit is coupled to two ends of the external LNA, and is configured to bypass the external LNA.

For example, the sending circuit of the radio frequency front-end module includes but is not limited to a component such as a power amplifier.

According to the first aspect, the processing circuit is configured to adjust at least one of a working current or a working voltage of the LNA based on the second WLAN signal. In this way, the apparatus can adjust the power consumption of the external LNA by adjusting the internal working current and/or the internal working voltage of the LNA.

In an embodiment of the first aspect, the power consumption mode includes a low power consumption mode or a high power consumption mode. A working current of the LNA in the low power consumption mode is a first current value. A working current of the LNA in the high power consumption mode is a second current value. The first current value is less than the second current value, and the first current value is greater than 0.

In this way, a working mode of the external LNA in this embodiment of this application can include the low power consumption mode and the high power consumption mode. For example, the external LNA further includes a non-working mode, namely, a bypass mode. For example, the apparatus in this embodiment of this application may configure the external LNA to different levels, to be specific, different power consumption modes, to accurately control the power consumption of the external LNA and the apparatus based on an actual requirement.

For example, the power consumption mode may further include a plurality of power consumption modes. For example, in ascending order of power consumption, the power consumption mode may include a first power consumption mode (which may correspond to the foregoing low power consumption mode), a second power consumption mode, a third power consumption mode, and a fourth power consumption mode (which may correspond to the foregoing high power consumption mode). Each power consumption mode corresponds to a different current and/or voltage.

For example, a current value of the low power consumption mode may be half of a current value of the high power consumption mode.

According to the first aspect or any implementation of the first aspect, the processing circuit is configured to adjust the LNA to the low power consumption mode when the second WLAN signal is a non-data frame. In this way, the processing circuit can determine a power consumption adjustment manner based on a transmission characteristic of the WLAN signal. For example, transmission characteristics of the non-data frame are strong capabilities of anti-interference and anti-noise, and insensitivity to environment interference. Therefore, the non-data frame may be received by using the external LNA in the low power consumption mode.

In an embodiment of the first aspect, the processing circuit is configured to adjust the power consumption mode of the LNA based on a service type and a communication quality parameter of the second WLAN signal when the second WLAN signal is a data frame. In this way, the processing circuit can further determine the power consumption mode of the LNA based on the service type and the communication quality of the data frame, to control the power consumption of the LNA more accurately.

In an embodiment of the first aspect, the processing circuit is configured to adjust the LNA to the low power consumption mode when a service type of a first WLAN signal is a low-priority service type and the communication quality parameter is less than a preset first threshold. In this way, for the data frame of the low-priority service type, the data frame is also insensitive to the interference, and such data frame may be received by using the LNA in the low power consumption mode.

For example, the communication quality parameter may optionally be an environment interference parameter. The processing circuit can control the power consumption of the LNA more accurately based on the environment interference parameter.

In an embodiment of the first aspect, the processing circuit is configured to adjust the LNA to the low power consumption mode when the service type of the second WLAN signal is a high-priority service type and the communication quality parameter meets a specified low power consumption condition. The communication quality parameter includes an environment interference parameter and a signal quality parameter. The low power consumption condition includes: The environment interference parameter is less than a first threshold, and the signal quality parameter is greater than a second threshold. In this way, when the data frame is a high-priority service, and current environment interference is small, the LNA may receive the WLAN signal by using the low power consumption mode, to reduce the power consumption of the device.

For example, the apparatus may control the power consumption of the LNA more accurately based on the environment interference and the signal quality, to dynamically control the power consumption of the device.

In an embodiment of the first aspect, the processing circuit is configured to adjust the LNA to the high power consumption mode when the service type of the second WLAN signal is a low-priority service type and the communication quality parameter is greater than a third threshold. In this way, when a service priority of the WLAN signal is low, and a current communication environment is poor, the data frame may be received in the high power consumption mode.

For example, the communication quality parameter may optionally be an environment interference parameter. For example, the apparatus may control the power consumption of the LNA more accurately based on the environment interference and the signal quality, to dynamically control the power consumption of the device.

In an embodiment of the first aspect, the processing circuit is configured to adjust the LNA to the high power consumption mode when the service type of the second WLAN signal is a high-priority service type and the communication quality parameter meets a specified high power consumption condition. The communication quality parameter includes an environment interference parameter and a signal quality parameter. The high power consumption condition includes: The environment interference parameter is greater than a third threshold, and the signal quality parameter is less than a fourth threshold. In this way, when a service priority of the WLAN signal is high, and a current communication environment is poor, the data frame may be received in the high power consumption mode.

For example, the apparatus may control the power consumption of the LNA more accurately based on the environment interference and the signal quality, to dynamically control the power consumption of the device.

In an embodiment of the first aspect, the second WLAN signal is a frame header of a signal frame, the radio frequency front-end module is further configured to receive a third WLAN signal from the antenna. The third WLAN signal is a frame body of the signal frame. The processing circuit is further configured to receive the third WLAN signal after gain amplification is performed by the LNA in the adjusted power consumption mode. In this way, this embodiment of this application provides a power consumption adjustment manner that uses the signal frame as a granularity. The apparatus can adjust the power consumption mode of the external LNA based on the frame type of the signal frame, to receive the frame body based on the adjusted external LNA, so as to achieve more accurate power consumption control by using a smaller adjustment granularity.

In an embodiment of the first aspect, the second WLAN signal is a signal frame obtained at a start moment of a first periodicity, the radio frequency front-end module is further configured to receive a third WLAN signal from the antenna. The third WLAN signal is another signal frame in the first periodicity. The processing circuit is further configured to receive the third WLAN signal after gain amplification is performed by the LNA in the adjusted power consumption mode. In this way, the processing circuit adjusts the power consumption of the LNA in each periodicity to reduce additional consumption caused by frequent switching of power consumption.

In an embodiment of the first aspect, if the LNA is adjusted to the low power consumption mode, the processing circuit is further configured to: obtain a communication quality parameter of the third WLAN signal based on a specified periodicity, and adjust the LNA to the high power consumption mode if the communication quality parameter meets the high power consumption condition. The communication quality parameter includes a packet error rate and/or a throughput rate. The high power consumption condition includes: The packet error rate is greater than a fifth threshold, and the throughput rate is greater than a sixth threshold. In this way, the processing circuit may adjust the power consumption of the LNA in real time based on the specified periodicity, to avoid a problem such as a signal receiving failure caused by a change of another factor.

According to a second aspect, an embodiment of this application provides a power consumption control method. The method is applied to a WLAN communication apparatus, the apparatus includes a processing circuit, and the method includes: The processing circuit receives a first WLAN signal after gain amplification is performed by an LNA in a radio frequency front-end module, and the processing circuit adjusts a power consumption mode of the LNA based on the first WLAN signal.

According to the second aspect, adjusting the power consumption mode of the LNA based on the first WLAN signal includes: adjusting at least one of a working current or a working voltage of the LNA based on the first WLAN signal.

In an embodiment of the second aspect, the power consumption mode includes a low power consumption mode or a high power consumption mode. A working current of the LNA in the low power consumption mode is a first current value. A working current of the LNA in the high power consumption mode is a second current value. The first current value is less than the second current value, and the first current value is greater than 0.

In an embodiment of the second aspect, adjusting the power consumption mode of the LNA based on the first WLAN signal includes: when the first WLAN signal is a non-data frame, adjusting the LNA to the low power consumption mode.

In an embodiment of the second aspect, adjusting the power consumption mode of the LNA based on the first WLAN signal includes: when the first WLAN signal is a data frame, adjusting the power consumption mode of the LNA based on a service type and a communication quality parameter of the first WLAN signal.

In an embodiment of the second aspect, adjusting the power consumption mode of the LNA based on the first WLAN signal includes: when the service type of the first WLAN signal is a low-priority service type and the communication quality parameter is less than a preset first threshold, adjusting the LNA to the low power consumption mode.

In an embodiment of the second aspect, the communication quality parameter is an environment interference parameter.

In an embodiment of the second aspect, adjusting a power consumption mode of the LNA based on the first WLAN signal includes: when the service type of the first WLAN signal is a high-priority service type and the communication quality parameter meets a specified low power consumption condition, adjusting the LNA to the low power consumption mode. The communication quality parameter includes an environment interference parameter and a signal quality parameter. The low power consumption condition includes: The environment interference parameter is less than a first threshold, and the signal quality parameter is greater than a second threshold.

In an embodiment of the second aspect, adjusting a power consumption mode of the LNA based on the first WLAN signal includes: when the service type of the first WLAN signal is a low-priority service type and the communication quality parameter is greater than a third threshold, adjusting the LNA to the high power consumption mode.

In an embodiment of the second aspect, the communication quality parameter is an environment interference parameter.

In an embodiment of the second aspect, adjusting a power consumption mode of the LNA based on the first WLAN signal includes: when the service type of the first WLAN signal is a high-priority service type, and a communication quality parameter meets a specified high power consumption condition, adjusting the LNA to the high power consumption mode. The communication quality parameter includes an environment interference parameter and a signal quality parameter, and the high power consumption condition includes: The environment interference parameter is greater than a third threshold, and the signal quality parameter is less than the fourth threshold.

In an embodiment of the second aspect, the first WLAN signal is a frame header of a signal frame, and the method further includes: The processing circuit receives the second WLAN signal after gain amplification is performed by the LNA in the adjusted power consumption mode. The second WLAN signal is a frame body of the signal frame.

In an embodiment of the second aspect, the first WLAN signal is a signal frame obtained at a start moment of a first periodicity, and the method further includes: The processing circuit receives the second WLAN signal after gain amplification is performed by the LNA in the adjusted power consumption mode. The second WLAN signal is another signal frame in the first periodicity.

In an embodiment of the second aspect, if the LNA is adjusted to the low power consumption mode, the method further includes: The processing circuit obtains the communication quality parameter of the second WLAN signal based on a specified periodicity, and adjusts the LNA to the high power consumption mode if the communication quality parameter meets the high power consumption condition. The communication quality parameter includes a packet error rate and/or a throughput rate. The high power consumption condition includes: The packet error rate is greater than a fifth threshold, and the throughput rate is greater than a sixth threshold.

In an embodiment of the second aspect respectively correspond to the first aspect and any implementation of the first aspect. For technical effects corresponding to the second aspect and any implementation of the second aspect, refer to technical effects corresponding to the first aspect and any implementation of the first aspect. Details are not described herein again.

In an embodiment of the application provides a radio frequency front-end module. The radio frequency front-end module includes an LNA and a bias circuit. The LNA is separately coupled to an antenna and a WLAN chip, and is configured to: receive a first WLAN signal from the antenna, and perform gain amplification on the first WLAN signal to obtain a second WLAN signal. The bias circuit is configured to: obtain a control signal from the WLAN chip, and adjust a power consumption mode of the LNA based on the control signal. The control signal is generated based on the second WLAN signal amplified by the LNA.

In an embodiment of the third aspect respectively correspond to the first aspect and any implementation of the first aspect. For technical effects corresponding to the third aspect and any implementation of the third aspect, refer to technical effects corresponding to the first aspect and any implementation of the first aspect. Details are not described herein again.

According to a fourth aspect, an embodiment of this application provides a chip. The chip includes at least one processor and an interface, and optionally further includes a memory. The processor is coupled to a radio frequency front-end module by using the interface. The at least one processor is configured to invoke instructions stored in the memory, to perform operations performed by the processing circuit in the second aspect or any implementation of the second aspect.

In an embodiment of the fourth aspect respectively correspond to the first aspect and any implementation of the first aspect. For technical effects corresponding to the fourth aspect and any implementation of the fourth aspect, refer to technical effects corresponding to the first aspect and any implementation of the first aspect. Details are not described herein again.

According to a fifth aspect, an embodiment of this application provides a computer-readable storage medium. The computer-readable storage medium stores a computer program, and when the computer program runs on a computer or a processor, the computer or the processor is enabled to perform the method in the second aspect or any possible implementation of the second aspect.

In an embodiment of the fifth aspect respectively correspond to the first aspect and any implementation of the first aspect. For technical effects corresponding to the fifth aspect and any implementation of the fifth aspect, refer to technical effects corresponding to the first aspect and any implementation of the first aspect. Details are not described herein again.

According to a sixth aspect, an embodiment of this application provides a computer program product. The computer program product includes a software program, and when the software program is executed by a computer or a processor, the method in the second aspect or any possible implementation of the second aspect is performed.

In an embodiment of the sixth aspect respectively correspond to the first aspect and any implementation of the first aspect. For technical effects corresponding to the sixth aspect and any implementation of the sixth aspect, refer to technical effects corresponding to the first aspect and any implementation of the first aspect. Details are not described herein again.

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by one of ordinary skilled in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object and a second target object are for distinguishing between different target objects, but are not used to describe a particular order of the target objects.

In addition, in embodiments of this application, the word "example" or "for example" is for representing giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like, is intended to present a related concept in a manner.

In the descriptions of embodiments of this application, unless otherwise stated, "a plurality of" means two or more. For example, a plurality of processing units means two or more processing units; and a plurality of systems mean two or more systems.

Figure 1:
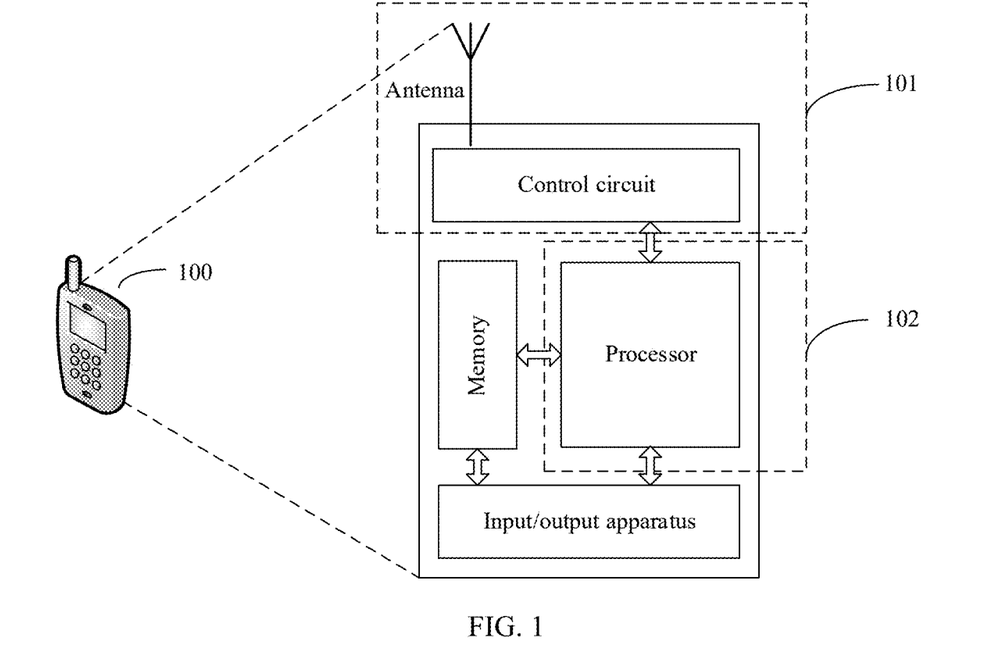
FIG. 1 is a schematic diagram of an example structure of a terminal device.

FIG. 1 is a diagram of a structure of a single-antenna terminal device. In an actual scenario, the terminal device may also have a plurality of antennas, and may be a device with more than two antennas. For ease of description, FIG. 1 shows only main components of the terminal device. As shown in FIG. 1, a terminal device 100 includes a processor, a memory, a control circuit, an antenna, and an input/output apparatus. The processor is mainly configured to: process a communication protocol and communication data, and control the entire terminal device, to execute a software program, and process data of the software program, for example, configured to support an action of the terminal device described in the embodiments of this application. The memory is mainly configured to: store the software program and the data, for example, store a correspondence between a threshold and a radio frequency (RF) channel described in this embodiment of this application. The control circuit is mainly configured to: convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, and a keyboard, is mainly configured to: receive data input by a user and output data to the user.

After the terminal device is powered on, the processor may read the software program in a storage unit, interpret and execute instructions of the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and sends out, by using the antenna, a radio frequency signal in the form of the electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

One of ordinary skilled in the art may understand that, for ease of description, FIG. 1 shows only one memory and one processor. In an actual terminal device, there may be a plurality of processors and a plurality of memories. The memory may also be referred to as a storage medium, a storage device, or the like. This is not limited in this embodiment of this application.

In an embodiment, the processor may include a baseband processor and/or a central processing unit. The baseband processor is mainly configured to process the communication protocol and the communication data. The central processing unit is mainly configured to: control the entire terminal device, execute the software program, and process the data of the software program. The processor in FIG. 1 may integrate functions of the baseband processor and the central processing unit. One of ordinary skilled in the art may understand that the baseband processor and the central processing unit may alternatively be independent processors, and are interconnected by using a technology such as a bus. One of ordinary skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in a storage unit in a form of a software program, and the processor executes the software program to implement a baseband processing function.

In this embodiment of this application, the antenna and the control circuit that have a transceiver function may be considered as a transceiver unit 101 of the terminal device 100, for example, is configured to support the terminal device in performing a receiving function and a sending function. The processor that has a processing function is considered as a processing unit 102 of the terminal device 100. As shown in FIG. 1, the terminal device 100 includes the transceiver unit 101 and the processing unit 102. The transceiver unit may also be referred to as a transceiver, a transceiver machine, a transceiver apparatus, or the like. In an embodiment, a component configured to implement the receiving function in the transceiver unit 101 may be considered as a receiving unit, and a component configured to implement the sending function in the transceiver unit 101 may be considered as a sending unit. In other words, the transceiver unit 101 includes the receiving unit and the sending unit. The receiving unit may also be referred to as a receiver machine, an input port, a receiving circuit, or the like. The sending unit may be referred to as a transmitter machine, a transmitter, a transmitting circuit, or the like.

The processing unit 102 may be configured to execute the instructions stored in the memory, to control the transceiver unit 101 to receive a signal and/or send a signal, so as to complete a function of the terminal device in this embodiment of this application. In an embodiment, it may be considered that functions of the transceiver unit 101 are implemented by using a transceiver circuit or a transceiver-dedicated chip, for example, the Wi-Fi chip in this embodiment of this application.

In the descriptions of this embodiment of this application, the terminal device may be a terminal product that supports the 802.11 series standard protocols or another similar standard protocol. The terminal device may be a wireless communication chip, a wireless sensor, a wireless communication terminal, or the like, and may also be referred to as a user, a station, or a terminal. For example, the station may be a mobile phone, a tablet computer, a set-top box, a smart TV, a smart wearable device, a vehicle-mounted communication device, a computer, or the like, that supports Wi-Fi. In an embodiment, the 802.11 series standards include but are not limited to at least one of the following standards: 802.11be, 802.11ax, 802.11ac, 802.11n, 802.11g, 802.11b, 802.11a, and the like. In an embodiment, the terminal device in this embodiment of this application supports 2.4G, 5G, 6G, and a higher frequency band.

It should be noted that the technical solutions in this embodiment of this application may be further applied to a short-range communication system such as a Bluetooth system and a ZigBee system. An embodiment in the short-range communication system is similar to that in the Wi-Fi system, and power consumption of an LNA is adjusted based on a received signal (for example, a Bluetooth signal). Examples are not described again in this application.

Figure 2:
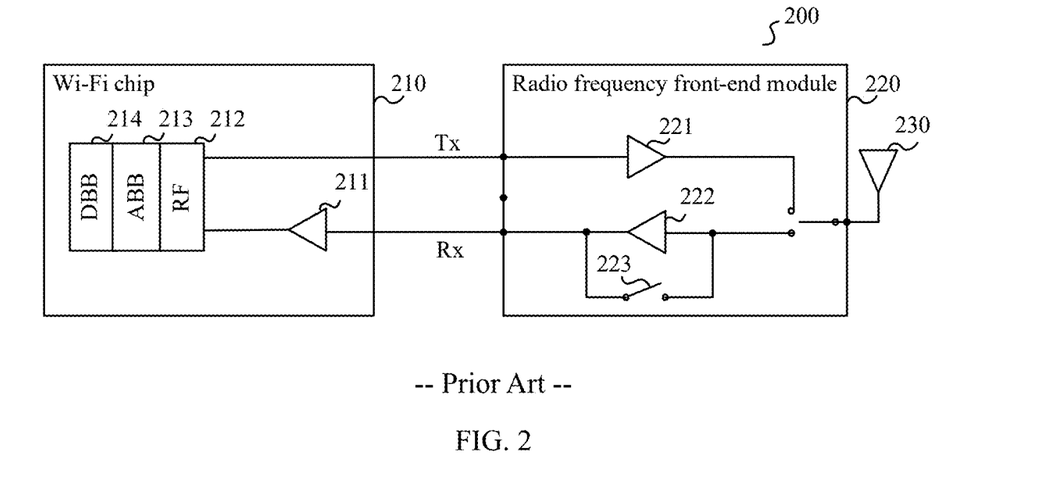
FIG. 2 is a schematic diagram of an example structure of a Wi-Fi system.

FIG. 2 is a schematic diagram of an example Wi-Fi system 200. Refer to FIG. 2. For example, the Wi-Fi system 200 includes a Wi-Fi chip 210, a radio frequency front-end module 220, and an antenna 230.

For example, the radio frequency front-end module 220 is coupled to the antenna 230, and the radio frequency front-end module 220 may receive a signal from the antenna or send a signal by using the antenna.

For example, the radio frequency front-end module 220 includes but is not limited to a power amplifier 221, an LNA 222, and a bypass circuit 223. It should be noted that types and a quantity of components in the radio frequency front-end module 220 are merely illustrative examples. In another embodiment, the radio frequency front-end module 220 may include more components. This is not limited in this application.

For example, the power amplifier 221 is disposed on a TX (transport, transmit) channel (TX for short below), and is configured to: perform corresponding processing on a signal input by the Wi-Fi chip by using a transmitter circuit, and output the processed signal to the antenna 230. For example, the LNA 222 is disposed on an RX (receive) channel (RX for short below), and is configured to: perform corresponding processing on a signal received from the antenna 230, and output the processed signal to the Wi-Fi chip 210.

For example, the bypass circuit 223 is coupled to two ends of the LNA 222, and is configured to bypass the LNA 222.

For example, the Wi-Fi chip 210 is coupled to the radio frequency front-end module 220. For example, the Wi-Fi chip 210 may send a signal by using the radio frequency front-end module 220. For example, the Wi-Fi chip 210 may receive a signal by using the radio frequency front-end module 220. The Wi-Fi chip 210 may switch between the TX and the RX in the radio frequency front-end module 220 and a working state of the LNA 222 by using a control signal.

For example, in an existing technology, a working mode of the LNA 222 includes a normal working mode and a bypass mode. For example, the Wi-Fi chip may determine the working mode of the LNA 222 based on a communication quality parameter of a signal received by the antenna 230. For example, the communication quality parameter of the signal includes but is not limited to at least one of the following: a received signal strength indication (RSSI), reference signal receiving quality (RSRQ), reference signal receiving power (RSRP), a signal to noise ratio (SNR), and the like.

For example, in an example, if the RSSI of the received signal is less than or equal to −30 dBm, the Wi-Fi chip 210 determines that the LNA 222 is in the normal working mode. Correspondingly, the Wi-Fi chip 210 may control, by using a control circuit, a switch on the bypass circuit 223 to turn off, to enable the LNA 222. To be specific, when the LNA 222 is in the normal working mode, the signal received by the radio frequency front-end module 220 from the antenna 230 is input to an input end of the LNA 222, and is output from an output end of the LNA 222 to the Wi-Fi chip 210. In another example, if the RSSI of the received signal is greater than ~30 dBm, the Wi-Fi chip 210 determines that the LNA 222 is in the bypass mode. Correspondingly, the Wi-Fi chip 210 may control, by using a control circuit, a switch on the bypass circuit 223 to turn on, to bypass the LNA 222. To be specific, when the LNA 222 is in the bypass mode, the signal received by the radio frequency front-end module 220 from the antenna 230 is output to the Wi-Fi chip 210 by using the bypass circuit 223.

For example, as described above, in the existing technology, there are two working modes of the external LNA: the normal working mode and the bypass mode. Correspondingly, a control logic set in the Wi-Fi chip is shown in Table 1.

TABLE 1

| Working mode | Logic control signal | |
|---|---|---|
| | State | Signal |
| Enabling the RX, where the external LNA is in the working mode | 1 | Signal 1 |
| Enabling the RX, where the external LNA is in the bypass mode | 2 | Signal 2 |
| Enabling the TX | 3 | Signal 3 |
| Isolated or disabled | 4 | Signal 4 |

As shown in Table 1, for example, the Wi-Fi chip may be configured with a table of a mapping relationship between the working mode and the logic control signal. For example, as described above, the Wi-Fi chip may determine a state, namely, the working mode, of the external LNA based on the communication quality parameter of the signal. The Wi-Fi chip may search for a corresponding signal based on the table of a mapping relationship. For example, in an example, when the Wi-Fi chip determines that the external LNA is in the working mode, the Wi-Fi chip may determine, by traversing the table of a mapping relationship shown in Table 1, that the corresponding signal is the signal 1. In an embodiment, the signal 1 indicates to enable the RX and turn off a switch on the bypass circuit 223. For example, the Wi-Fi chip may send the signal 1 to the radio frequency front-end module by using the control circuit, to enable the RX in the radio frequency front-end module and control the switch on the bypass circuit 223 to turn off. Correspondingly, the signal that is output by the antenna 230 to the radio frequency front-end module 220 is input to the input end of the external LNA 222. After the external LNA 222 processes the signal, the signal is output from the output end of the external LNA 222 to the Wi-Fi chip 210. In another example, when the Wi-Fi chip determines that the external LNA is in the bypass mode, the Wi-Fi chip may determine, by traversing the table of a mapping relationship shown in Table 1, that the corresponding signal is the signal 2. In an embodiment, the signal 2 indicates to enable the RX and turn on a switch on the bypass circuit 223. For example, the Wi-Fi chip may send the signal 2 to the radio frequency front-end module by using the control circuit, to enable the RX in the radio frequency front-end module and control the switch on the bypass circuit 223 to turn on. Correspondingly, the signal output by the antenna 230 to the radio frequency front-end module 220 flows through the bypass circuit 223, and is output to the Wi-Fi chip 210. In still another example, when the Wi-Fi chip determines that a signal needs to be sent, the Wi-Fi chip may determine, by traversing the table of a mapping relationship shown in Table 1, that the corresponding signal is the signal 3. In an embodiment, the signal 3 indicates to enable the TX. Correspondingly, the Wi-Fi chip may send the signal 3 to the radio frequency front-end module by using the control circuit, to enable the TX, so that the antenna is coupled to the TX. In still another example, the Wi-Fi chip may send the signal 4 to the radio frequency front-end module, to indicate that the radio frequency front-end module is in an isolated or disabled state, namely, a non-working state.

It should be noted that, in this application, only switching of different modes of the external LNA on the RX is described. For switching between the RX, the TX, and the isolated (or disabled) state, refer to the existing technology. Details are not described again in this application.

It should be further noted that the Wi-Fi system 200 optionally works in a time division multiplexing manner. For example, in the Wi-Fi system 200, a ratio of working duration of the RX to working duration of the TX is about 7 to 3. Correspondingly, the Wi-Fi chip may send a corresponding signal to the radio frequency front-end module 220 based on a configured table of a mapping relationship (for example, Table 1), to enable the RX or the TX. To be specific, working power consumption of the RX directly determines working duration of an electronic device that works by using a battery.

Still refer to FIG. 2. For example, the Wi-Fi chip 210 includes but is not limited to an LNA 211, an RF (Radio Frequency) 212, an ABB (analog baseband) 213, and a DBB (digital baseband) 214. To distinguish the LNA 222 from the LNA 211, the LNA in the radio frequency front-end module, namely, the LNA 222, is referred to as the external LNA (which may be denoted as an eLNA), and the LNA 211 is referred to as an internal LNA (which may be denoted as an iLNA) below.

For example, the power consumption of the RX mainly includes three parts: the DBB, the ABB, and the radio frequency. The DBB and the ABB are included in the Wi-Fi chip. The RF part includes the external LNA in the radio frequency front-end module, the internal LNA in the Wi-Fi chip, and another radio frequency component. For details about power consumption of each part, refer to Table 2.

TABLE 2

| | Radio | Wi-Fi chip | | |
|---|---|---|---|---|
| Power consumption | frequency front-end module External LNA | Internal LNA and another RF component | ABB | DBB |
| Power supply voltage (V) | 3.6 | 1.0 | 1.0 | 1.0 |
| Current (mA) | 12 | 11 | 15 | 20 |
| Power consumption (mW) | 43.2 | 11 | 15 | 20 |

TABLE 2-continued

| Power consumption | Radio frequency front-end module External LNA | Wi-Fi chip | | |
| --- | --- | --- | --- | --- |
| | | Internal LNA and another RF component | ABB | DBB |
| Power consumption proportion | 49% | 12% | 17% | 22% |

Refer to Table 2. For example, a power consumption proportion of the radio frequency part and the analog part exceeds 70%, and a power consumption proportion of the external LNA is close to 50% in the working state. As described above, the working power consumption of the RX directly determines the working duration of the electronic device that works by using the battery. In addition, working power consumption of the external LNA determines the power consumption of the RX. In other words, higher working power consumption of the external LNA indicates higher power consumption of the RX and higher power consumption of the electronic device.

For example, in an actual application, for example, a home application scenario is used as an example. For example, in the home application scenario, a router is in a living room, a mobile phone is in a bedroom, and a load-bearing wall separates the bedroom and the living room. A Wi-Fi signal of the router needs to pass through the wall. It is well known to One of ordinary skilled in the art that passing through a wall by the Wi-Fi signal causes attenuation of the Wi-Fi signal. Correspondingly, a communication quality parameter (for example, signal strength) of the Wi-Fi signal received by the mobile phone is poor. For example, the mobile phone (a Wi-Fi chip) detects that an RSSI of the Wi-Fi signal is less than or equal to −30 dBm. Therefore, the Wi-Fi chip needs to configure the external LNA in the radio frequency front-end module to the working state, so as to increase a Wi-Fi signal gain. In this case, the external LNA is always in the normal working mode with a maximum current, and the power consumption of the external LNA is close to 50%, as described above.

Currently, the Wi-Fi chip configures the working mode of the external LNA based on only signal strength of the Wi-Fi signal received by the antenna, but cannot switch the working mode of the external LNA based on an actual requirement. In addition, the external LNA remains in a high-power-consumption working mode (namely, the normal working mode described above) with the maximum current for long time, which increases battery power consumption and shortens service duration of a terminal.

Figure 3:
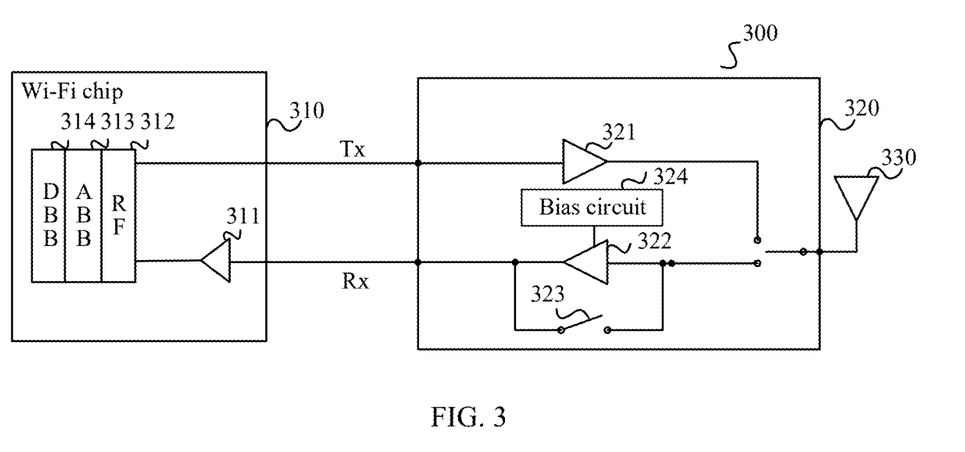
FIG. 3 is a schematic diagram of a structure of a Wi-Fi system according to an embodiment of this application.

FIG. 3 is a schematic diagram of a structure of a Wi-Fi system according to an embodiment of this application. Refer to FIG. 3. For example, the Wi-Fi system 300 includes a Wi-Fi chip 310, a radio frequency front-end module 320, and an antenna 330.

For example, the radio frequency front-end module 320 includes but is not limited to a power amplifier 321, an external LNA 322, a bypass circuit 323, and a bias circuit 324.

For example, the Wi-Fi chip is coupled to the radio frequency front-end module 320. For example, the Wi-Fi chip may send a control signal to the radio frequency front-end module 320 by using a control circuit, to control switching between an RX and a TX in the radio frequency front-end module 320, and control a working mode (which may also be referred to as a power consumption mode) of the external LNA on the RX.

For example, in this embodiment of this application, the working mode of the external LNA includes but is not limited to a high power consumption mode, a low power consumption mode, and a bypass mode.

For example, the high power consumption mode may also be referred to as a normal working mode. For example, as shown in Table 1, when a working current of the external LNA is 12 mA and a working voltage is 3.6 V, the external LNA is in the normal mode.

For example, when the external LNA is in the low power consumption mode, the working current of the external LNA is optionally 6 mA, and the working voltage of the external LNA is 3.6 V. For example, when the external LNA is in the low power consumption mode, the working current of the external LNA is optionally 12 mA, and the working voltage of the external LNA is 1.8 V. To be specific, in this embodiment of this application, the Wi-Fi chip may change, by using the bias circuit 324, a current value and/or a voltage value when the external LNA works, so that the external LNA switches between the high power consumption mode and the low power consumption mode. It should be noted that the current value and the voltage value in this embodiment of this application are merely examples. This is not limited in this application.

Still refer to FIG. 3. For example, the Wi-Fi chip 310 includes but is not limited to components such as an internal LNA 311, an RF 312, an ABB 313, and a DBB 314.

For example, the Wi-Fi chip 310 may send the control signal to the radio frequency front-end module 320, to control a current of the bias circuit 324 in the external LNA 322. For example, it is assumed that a maximum working current of the external LNA is 12 mA. The bias circuit 324 may divide a circuit whose original current is 12 mA into a first circuit and a second circuit by disposing a plurality of switches inside the external LNA, where a current of the first circuit is 6 mA, and a current of the second circuit is 6 mA. Correspondingly, the bias circuit may enable at least one of the first circuit and the second circuit based on the received control signal of the Wi-Fi chip, to control an internal working current of the external LNA. For example, the bias circuit 324 enables the first circuit and disconnects the second circuit based on an indication of the Wi-Fi chip. Correspondingly, the current of the external LNA is 6 mA. In this embodiment of this application, the current of the external LNA can be reduced to half of the original current in the existing technology, to reduce the power consumption of the external LNA, and further reduce overall power consumption of the Wi-Fi system.

It should be noted that the foregoing current control manner is merely an example. In another embodiment, the current of the external LNA 322 may alternatively be controlled in another manner, to achieve an objective of reducing power consumption.

It should be further noted that, in this embodiment of this application, only an example in which the working mode of the external LNA includes the high power consumption mode and the low power consumption mode is used for description. In another embodiment, the working mode of the external LNA may include a plurality of modes, for example, a first power consumption mode, a second power consumption mode, and a third power consumption mode. Each power consumption mode may correspond to a different current. For example, a current corresponding to the first power consumption mode is 4 mA, a current corresponding to the second power consumption mode is 6 mA, and a current corresponding to the third power consumption mode is 2 mA. This is not limited in this application. The bias circuit needs to support corresponding logic control in different working modes. In this embodiment of this application, the high power consumption mode and the low power consumption mode are used as examples, and the corresponding control logic is shown in Table 3.

TABLE 3

| Working mode | Logic control signal | |
|---|---|---|
| | State | Signal |
| Enabling the RX, where the external LNA is in the high power consumption mode | 1 | Signal 1 |
| Enabling the RX, where the external LNA is in the low power consumption mode | 2 | Signal 2 |
| Enabling the RX, where the external LNA is in the bypass mode | 3 | Signal 3 |
| Enabling the TX | 4 | Signal 4 |
| Isolated or disabled | 5 | Signal 5 |
| ... | ... | ... |

Refer to Table 3. For example, a corresponding mapping table is set for the Wi-Fi chip to record correspondences between different working modes and signals. After determining a working mode corresponding to the radio frequency front-end module 320, the Wi-Fi chip may send a corresponding signal to the radio frequency front-end module 320 by using the control circuit, to indicate the radio frequency front-end module 320 to switch to a corresponding working mode. For example, the Wi-Fi chip determines that the working mode of the radio frequency front-end module 320 is enabling the RX, where the external LNA is in the high power consumption mode, and the corresponding signal is the signal 1. The Wi-Fi chip may send the signal 1 to the radio frequency front-end module 320 by using the control circuit. For example, the bias circuit 324 in the radio frequency front-end module 320 may switch, based on an indication of the signal 1, the current of the external LNA to a current corresponding to the high power consumption mode. For example, as described above, the bias circuit 324 may enable the first circuit and the second circuit so that the current of the external LNA is 12 mA. In an embodiment, the bias circuit 324 may be configured with a correspondence between a signal and a control manner, to determine a corresponding control manner based on a received signal. A correspondence may be set based on an actual requirement. This is not limited in this application. In other words, in this embodiment of this application, the Wi-Fi chip is configured with the mapping relationship between a working mode and a signal, and the bias circuit is configured with the mapping relationship between a signal and a control manner. In addition, there is a one-to-one correspondence between the mapping relationship configured by the Wi-Fi chip and the mapping relationship configured by the bias circuit. It may be understood that corresponding control logic is configured for the Wi-Fi chip and the radio frequency front-end module in this embodiment of this application, and the radio frequency front-end module may switch between different working states based on control logic indicated by different signals of the Wi-Fi chip.

The bias circuit 324 may be a control circuit disposed in the external LNA or outside the external LNA. A location of the bias circuit 324 is merely an example, and this is not limited in this application.

For descriptions of the bypass mode, refer to related descriptions in FIG. 2. Details are not described herein again. For example, the bypass mode essentially may also be understood as that the current of the external LNA 322 is set to 0, so that the external LNA 322 does not work.

It should be noted that, in the following embodiments, an example in which the Wi-Fi chip controls the current of the external LNA to change the working mode of the external LNA is used for description. A manner in which the Wi-Fi chip controls a voltage of the external LNA, or a voltage and a current of the external LNA is similar to the control manner of the current in this embodiment. Details are not described again in this application.

It should be further noted that for a connection relationship between the modules, refer to related descriptions in FIG. 2. Details are not described herein again.

Figure 4:
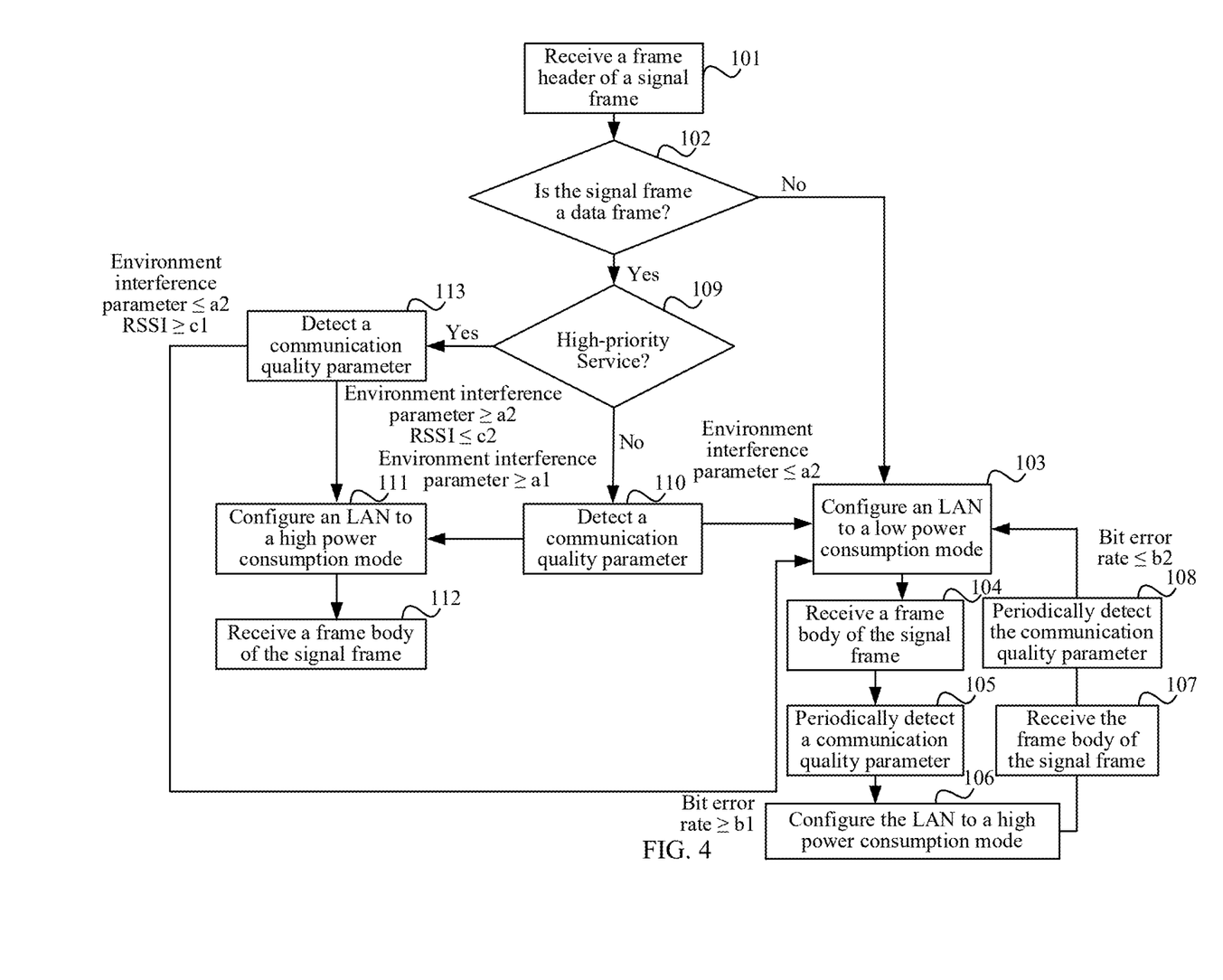
FIG. 4 is a schematic flowchart of a power consumption control method according to an embodiment of this application.

With reference to FIG. 3, FIG. 4 is a schematic flowchart of a power consumption control method according to an embodiment of this application. Refer to FIG. 4. The method includes the following operations.

S101: Receive a frame header of a signal frame.

Refer to FIG. 3. For example, the antenna 330 receives the frame header of the signal frame, and inputs the frame header of the signal frame to the RX in the radio frequency front-end module 320.

For example, an example in which the external LNA in the radio frequency front-end module 320 is currently in a bypass state is used for description. It should be noted that the current state of the external LNA is merely an example. Actually, the current state of the external LNA depends on a result of a previous control procedure, or the state of the external LNA may be an initial state. For example, after an electronic device is powered on, the initial state of the external LNA may be any one of the bypass state, a high power consumption state, or a low power consumption state. This is not limited in this application.

For example, it is assumed that in the previous control procedure, the working mode of the external LNA 322 is configured to be the bypass mode. Correspondingly, the frame header of the signal frame input by the antenna 330 is output to the Wi-Fi chip 310 by using the bypass circuit 323.

The Wi-Fi chip 310 receives the frame header of the signal frame input by the radio frequency front-end module 320.

S102: Determine whether the signal frame is a data frame.

For example, after receiving the frame header of the signal frame input by the radio frequency front-end module 320, the Wi-Fi chip 310 may determine, based on the frame header of the received signal frame, whether the signal frame is a data frame.

In an embodiment, the data frame may optionally be understood as that a frame body part of the signal frame carries data. In an embodiment, a non-data frame includes but is not limited to a Beacon frame, a management frame, and a control frame.

It should be noted that the data frame is usually transmitted at a high rate. The non-data frame, such as the management frame, is usually transmitted at a low rate. Correspondingly, because a transmission rate of the non-data frame is lower, capabilities of anti-interference and anti-noise of the non-data frame are stronger.

In this embodiment of this application, for the non-data frame with strong capabilities of anti-interference and anti-noise, the external LNA may process the signal in the low power consumption mode with low power consumption. That is, the procedure proceeds to S103. For example, if the received signal frame is the data frame, the procedure proceeds to S109.

S103: Configure the external LNA to the low power consumption mode.

For example, as described above, the Wi-Fi chip 310 determines, in response to the received frame header of the signal frame, that the signal frame is the non-data frame, for example, the management frame. The Wi-Fi chip 310 may determine, in response to the non-data frame type of the obtained signal frame, to configure the external LNA to the low power consumption mode.

For example, when determining the working mode of the external LAN, the Wi-Fi chip 310 may determine a corresponding signal based on a mapping relationship between the working mode of the radio frequency front-end module and the signal. For example, as shown in Table 3, the Wi-Fi chip 310 determines that the working mode of the radio frequency front-end module is enabling the RX, where the external LNA is in the low power consumption mode. The Wi-Fi chip 310 determines, based on the mapping relationship, that the corresponding signal is the signal 2. Refer to FIG. 3. For example, the Wi-Fi chip 310 may send the signal 2 to the radio frequency front-end module 320 by using the control circuit. The radio frequency front-end module 320 may enable the RX in response to the signal 2. In addition, the bias circuit 324 may adjust the current of the external LNA to a current corresponding to the low power consumption mode, for example, 6 mA. For a control manner, refer to the foregoing descriptions. Details are not described herein again.

S104: Receive a frame body of the signal frame.

For example, the antenna 330 receives the frame body of the signal frame. The antenna 330 inputs the received frame body of the signal frame to the radio frequency front-end module 320. For example, the frame body of the signal frame is input to an input end of the external LNA 322 in the radio frequency front-end module 320. The external LNA 322 performs corresponding processing on the frame body of the signal frame. For example, the external LNA 322 outputs the processed frame body of the signal frame to the Wi-Fi chip 310. The Wi-Fi chip 310 receives the signal (namely, the frame body of the signal frame) input by the radio frequency front-end module 320.

S105: Periodically detect a communication quality parameter.

For example, the Wi-Fi chip 310 receives the signal, namely, the frame body of the signal frame, input by the radio frequency front-end module 320. In this embodiment of this application, when the external LNA is in the low power consumption mode, the Wi-Fi chip 310 may periodically obtain a corresponding communication quality parameter based on the received signal, to dynamically adjust the working mode of the external LNA.

In an embodiment, the communication quality parameter may be at least one of the following: a bit error rate and a throughput rate. For example, the Wi-Fi chip 310 may determine, based on the obtained communication quality parameter and a specified threshold, the working mode of the external LNA 322, including whether to continue to maintain the low power consumption mode or switch to the high power consumption mode.

For example, the bit error rate is used as an example. In an example, the Wi-Fi chip 310 may store a specified bit error rate threshold (for example, b1). When a corresponding bit error rate obtained by the Wi-Fi chip 310 in a current periodicity is greater than or equal to b1, the Wi-Fi chip 310 determines to switch the working mode of the external LNA 322 to the high power consumption mode, and the procedure proceeds to S106. To be specific, when communication quality of the received signal is poor, the working mode of the external LNA 322 may be switched to the high power consumption mode, to increase receiving power of the radio frequency front-end module 320 and improve a processing capability of the radio frequency front-end module 320, so that the communication quality of the signal received by the Wi-Fi chip 310 can be further improved.

In another example, when a corresponding bit error rate obtained by the Wi-Fi chip 310 in a current periodicity is less than b1, the Wi-Fi chip 310 determines that the working mode of the external LNA 322 is still the low power consumption mode.

It should be noted that a periodicity duration corresponding to periodically obtaining the communication quality is less than a frame body length of the signal frame.

S106: Configure the external LNA to the high power consumption mode.

For a configuration manner, refer to the foregoing descriptions. Details are not described herein again.

S107: Receive the frame body of the signal frame.

For example, based on the foregoing procedure, the antenna 330 continues to receive the frame body of the signal frame, and outputs the received signal to the radio frequency front-end module 320. For example, the radio frequency front-end module 320 is currently in the high power consumption mode. The radio frequency front-end module 320 performs corresponding processing on the signal, and outputs the signal to the Wi-Fi chip 310. The Wi-Fi chip 310 receives the signal (namely, the frame body of the signal frame) input by the radio frequency front-end module 320.

S108: Periodically detect the communication quality parameter.

For example, the bit error rate is still used as an example. In an example, when a bit error rate corresponding to the signal obtained by the Wi-Fi chip 310 is less than or equal to b2, the Wi-Fi chip 310 determines that the working mode of the external LNA 322 is the low power consumption mode, that is, the procedure proceeds to S103. To be specific, after the communication quality parameter of the signal is improved, the Wi-Fi chip 310 may adaptively switch the working mode of the external LNA to the low power consumption mode again, to dynamically switch the working mode of the external LNA based on a requirement, so as to minimize the power consumption and ensure the communication quality. In an embodiment, b2 may be less than b1, to prevent frequent switching of the working mode of the external LNA.

In another example, when a bit error rate corresponding to the signal obtained by the Wi-Fi chip 310 is greater than b2, the Wi-Fi chip 310 determines that the working mode of the external LNA 322 is still the high power consumption mode, and performs no processing.

For other content that is not described, refer to related content of S105. Details are not described herein again.

S109: Determine whether data carried in the data frame is a high-priority service.

For example, after determining that the signal frame is the data frame, the Wi-Fi chip may further determine a service level of the data carried in the data frame.

For example, for an application scenario of a background and data type, data corresponding to such service has a strong fault tolerance capability, and this type of service may be classified as a low-priority service. For an application scenario of a voice and video type, this type of service requires a low delay and retransmission rate, and this type of service can be classified as a high-priority service. It is clear that, in another embodiment, the Wi-Fi chip 310 may further set a high-priority service list, for example, classify services corresponding to some important applications into the high-priority service. The service level may be set based on an actual requirement. This is merely an example in this application, and is not limited in this application.

For example, in this embodiment of this application, after determining the service level, the Wi-Fi chip 310 may further determine the working mode of the external LNA based on the communication quality parameter.

In an example, when the Wi-Fi chip 310 determines that the data carried in the frame body of the signal frame corresponds to the low-priority service, the procedure proceeds to S110.

In an example, when the Wi-Fi chip 310 determines that the data carried in the frame body of the signal frame corresponds to the high-priority service, the procedure proceeds to S113.

S110: Detect the communication quality parameter.

For example, the Wi-Fi chip 310 obtains a corresponding communication quality parameter based on the received signal. In an embodiment, the communication quality parameter may optionally include an environment interference parameter. It may be understood that, for the low-priority service, the working mode of the external LNA is optionally affected by environment interference.

In an example, if the environment interference parameter is greater than or equal to a1, the Wi-Fi chip 310 configures the external LNA to the high power consumption mode, and the procedure proceeds to S111.

In another example, if the environment interference parameter is less than or equal to a2, the Wi-Fi chip 310 configures the external LNA to the low power consumption mode, and the process proceeds to S103.

It should be noted that an environment interference threshold (including a1 and a2) may be set based on an actual requirement. This is not limited in this application. In an embodiment, a2 may be less than a1, to prevent frequent switching.

S111: Configure the external LNA to the high power consumption mode.

S112: Receive the frame body of the signal frame.

S113: Detect the communication quality parameter.

For example, the high-priority service is usually sensitive to the environment interference. For example, when the communication quality is poor, an erratic video image, a voice call frame freezing, and the like, may be caused. Therefore, the Wi-Fi chip 310 may determine, based on communication quality parameters such as the environment interference parameter and an RSSI, the working mode of the external LNA 322.

In an example, if the environment interference parameter is less than or equal to a2, and the RSSI is greater than or equal to c1, the Wi-Fi chip 310 configures the external LNA to the low power consumption mode, and the procedure proceeds to S103. It should be noted that, if one of the foregoing conditions is met, low power consumption switching is not performed.

In an example, if the environment interference parameter is greater than or equal to a2, the RSSI is less than or equal to c2, the Wi-Fi chip 310 configures the external LNA to the high power consumption mode, and the procedure proceeds to S111.

It should be noted that only the RSSI is used as an example for description above. Alternatively, in another embodiment, refer to another communication quality parameter and a corresponding threshold, for example, an SNR. The threshold may be set based on an actual requirement. This is not limited in this application.

It should be further noted that, when the Wi-Fi system 300 receives a next signal frame, S101 to S113 are repeated.

Scenario 2

Figure 5:
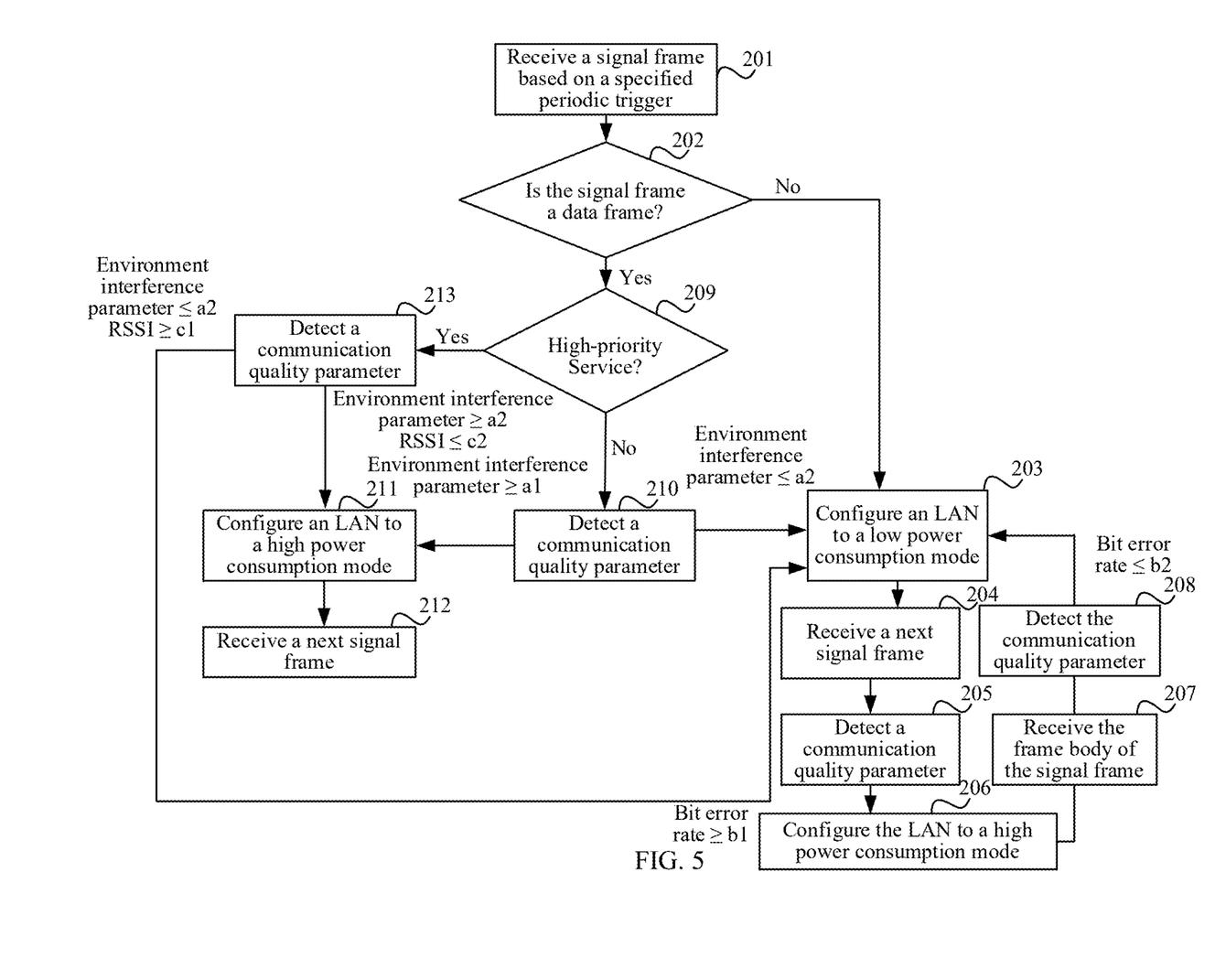
FIG. 5 is a schematic flowchart of a power consumption control method according to an embodiment of this application.

In the operations in scenario 1, operations S101 to S113 are performed on each received signal frame by using the signal frame as a unit of processing. In this embodiment of this application, the Wi-Fi system 300 may further process, based on a specified periodicity, a signal frame received within the periodicity. With reference to FIG. 3, FIG. 5 shows a power consumption control method according to an embodiment of this application. Refer to FIG. 5. The method includes:

S201: Receive a signal frame based on a specified periodic trigger.

For example, the Wi-Fi chip 310 may preset a periodicity, and periodicity duration may be set based on an actual requirement. This is not limited in this application. For example, a timer may be set for the Wi-Fi chip 310, and a length of the timer is the foregoing periodicity duration. The timer repeats timing, and each time when the timer expires, in other words, when the periodicity arrives, the procedure proceeds to S202.

S202: Determine whether the signal frame is a data frame.

For example, because execution is performed in a unit of periodicity in this embodiment, the Wi-Fi chip 310 may currently receive a frame header or a frame body. This is not limited in this application. For other descriptions, refer to S102. Details are not described herein again.

S203: Configure the external LNA to the low power consumption mode.

For details, refer to related content in S103. Details are not described herein again.

S204: Receive a next signal frame.

For example, after the Wi-Fi chip 310 configures the external LNA to the low power consumption mode, the antenna 330 outputs the received next signal frame to an input end of the external LNA 332. After performing corresponding processing, the external LNA 332 outputs the signal to the Wi-Fi chip 310.

S205: Periodically detect a communication quality parameter.

S206: Configure the external LNA to the high power consumption mode.

S207: Receive the frame body of the signal frame.

S208: Periodically detect the communication quality parameter.

S209: Determine whether data carried in the data frame is a high-priority service.

S210: Detect the communication quality parameter.

S211: Configure the external LNA to the high power consumption mode.

S212: Receive the next signal frame.

S213: Detect the communication quality parameter.

For content of S205 to S213, refer to related content of S105 to S113. Details are not described herein again.

In an embodiment, the Wi-Fi chip 310 may further configure the working mode of the external LNA based on a current communication stage of the Wi-Fi system. In the 802.11 protocol, a process in which an electronic device performs Wi-Fi communication includes a plurality of communication modes, including a listen stage, a scanning stage, a network selection stage, an authentication stage, an association stage, and the like. For descriptions of each stage, refer to related content of the 802.11 protocol. Details are not described again in this application. In an embodiment, in this embodiment of this application, when the Wi-Fi system 300 is in the listen stage, because the listen stage has a low requirement on communication performance, the Wi-Fi chip 310 may configure the external LNA to the low power consumption mode. In an embodiment, for the scanning stage, the network selection stage, and the association stage, electronic devices usually exchange signaling at a low order rate, and a corresponding anti-interference capability of the data is strong. Correspondingly, the Wi-Fi chip may configure the external LNA to the low power consumption mode. In an embodiment, in another service scenario, for example, a power-on or power-off process of the electronic device, the Wi-Fi chip may also configure the external LNA to the low power consumption mode. In conclusion, in this embodiment of this application, the Wi-Fi chip may configure the external LNA to a corresponding working mode based on a scenario requirement, for example, with reference to an anti-interference capability of signaling interaction, an environment factor, and a service requirement.

Figure 6:
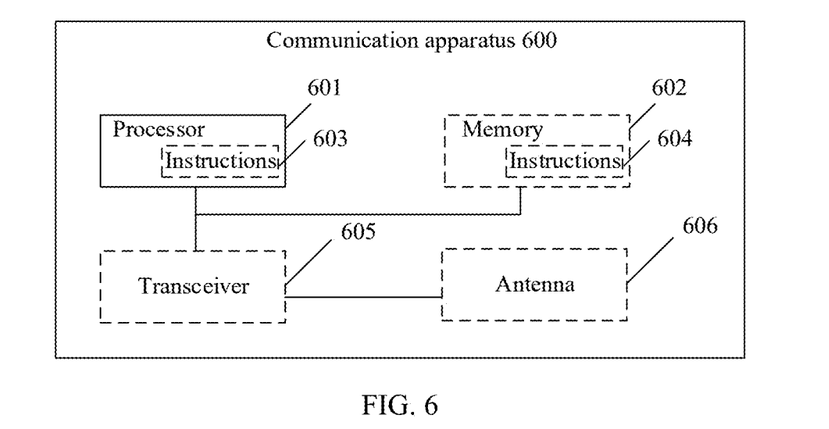
FIG. 6 is a schematic diagram of an example structure of an apparatus.

The following describes an apparatus provided in an embodiment of this application. As shown in FIG. 6:

FIG. 6 is a schematic diagram of a structure of a communication apparatus according to an embodiment of this application. As shown in FIG. 6, the communication apparatus 600 may include a processor 601 and a transceiver 605, and in an embodiment, further includes a memory 602.

The transceiver 605 may be referred to as a transceiver unit, a transceiver machine, a transceiver circuit, or the like, and is configured to implement a transceiver function. The transceiver 605 may include a receiver and a transmitter. The receiver may be referred to as a receiver machine, a receiving circuit, or the like, and is configured to implement a receiving function. The transmitter may be referred to as a transmitter machine, a sending circuit, or the like, and is configured to implement a sending function.

The memory 602 may store a computer program, software code, or instructions 604, and the computer program, the software code, or the instructions 604 may also be referred to as firmware. The processor 601 may control an MAC layer and a PHY layer by running the computer program, the software code, or the instructions 603, or by invoking the computer program, the software code, or the instructions 604 stored in the memory 602, to implement the OM negotiation method provided in the following embodiments of this application. The processor 601 may be a central processing unit (CPU), and the memory 602 may be, for example, a read-only memory (ROM) or a random access memory (RAM).

The processor 601 and the transceiver 605 described in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like.

The communication apparatus 600 may further include an antenna 606. Modules included in the communication apparatus 600 are merely examples for description. This is not limited in this application.

As described above, the communication apparatus described in the foregoing embodiment may be a terminal. However, a scope of the communication apparatus described in this application is not limited thereto, and a structure of the communication apparatus may not be limited to FIG. 6. The communication apparatus may be an independent device or may be a part of a larger device. For example, the communication apparatus may be implemented in the following forms:

(1) an independent integrated circuit IC, a chip, or a chip system or subsystem, where for example, the apparatus 600 may be the Wi-Fi chip in the foregoing embodiments; (2) having a set of one or more ICs, where in an embodiment, the IC set may also include a storage component configured to store data and instructions; (3) a module that can be embedded in another device; (4) a receiver machine, an intelligent terminal, a wireless device, a handset, a mobile unit, a vehicle-mounted device, a cloud device, an artificial intelligence device, and the like; (5) another form; and the like.

Figure 7:
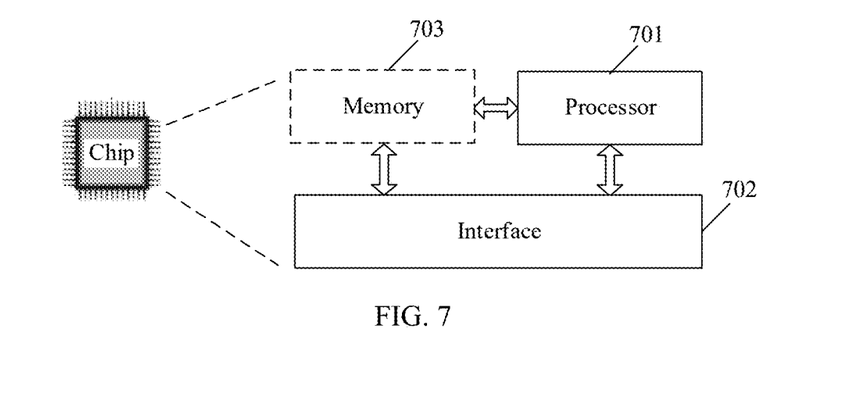
FIG. 7 is a schematic diagram of an example structure of a chip.

For a case in which an implementation form of the communication apparatus is the chip or the chip system, refer to a schematic diagram of structure of a chip shown in FIG. 7. The chip shown in FIG. 7 includes a processor 701 and an interface 702. There may be one or more processors 701, and there may be a plurality of interfaces 702. In an embodiment, the chip or the chip system may include a memory 703. In an embodiment, the chip 700 may be the foregoing Wi-Fi chip.

In an embodiment, a radio frequency front-end module is integrated on the Wi-Fi chip, and other components, including a radio frequency channel, an antenna, and the like, are disposed outside the chip.

In an embodiment, an antenna and a radio frequency front-end module are disposed outside the Wi-Fi chip.

All related content of the operations in the foregoing method embodiments may be cited in function descriptions of the corresponding functional modules. Details are not described herein again.

Based on a same technical concept, an embodiment of this application further provides a computer-readable storage medium. The computer-readable storage medium stores a computer program, the computer program includes at least one code segment, and the at least one code segment may be executed by a terminal device, to control the terminal device to implement the foregoing method embodiments.

Based on a same technical concept, an embodiment of this application further provides a computer program. When the computer program is executed by a terminal device, the computer program is for implementing the foregoing method embodiments.

The program may be all or partially stored in a storage medium that is encapsulated with a processor, or may be all or partially stored in a memory that is not encapsulated with a processor.

Based on a same technical concept, an embodiment of this application further provides a processor. The processor is configured to implement the foregoing method embodiments. The foregoing processor may be a chip.

Methods or algorithm operations described in combination with the content disclosed in this embodiment of this application may be implemented by hardware, or may be implemented by a processor by executing software instructions. The software instructions may include corresponding software modules. The software modules may be stored in a random access memory (Random Access Memory, RAM), a flash memory, a read-only memory (ROM), an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. It is clear that, the storage medium may alternatively be a component of the processor. The processor and the storage medium may be disposed in an ASIC. In addition, the ASIC may be disposed in a network device. Certainly, the processor and the storage medium may alternatively exist in a network device as discrete components.

One of ordinary skilled in the art should be aware that in the foregoing one or more examples, functions described in embodiments of this application may be implemented by hardware, software, firmware, or any combination thereof. When implemented by the software, these functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a general-purpose or dedicated computer.

The foregoing describes embodiments of this application with reference to the accompanying drawings. However, this application is not limited to the foregoing implementations. The foregoing implementations are merely examples, and not limitation. Inspired by this application, One of ordinary skilled in the art may further make many modifications without departing from the purposes of this application and the protection scope of the claims, and all the modifications shall fall within the protection scope of this application.

What is claimed is:

1. A wireless local area network communication apparatus, comprising:
   a radio frequency front-end module having a low noise amplifier (LNA) coupled to an antenna configured to: receive a first wireless local area network (WLAN) signal from the antenna, and perform gain amplification on the first WLAN signal to obtain a second WLAN signal; and
   a processing circuit, coupled to the LNA, configured to: receive the second WLAN signal, and adjust a power consumption mode of the LNA based on the second WLAN signal, wherein when a service type of the second WLAN signal is a high-priority service type, the processing circuit is configured to adjust the LNA to a low power consumption mode based on a communication quality parameter of the second WLAN signal, wherein the power consumption mode comprises the low power consumption mode or a high power consumption mode, wherein a working current of the LNA in the low power consumption mode is a first current value, wherein a working current of the LNA in the high power consumption mode is a second current value, wherein the first current value is less than the second current value, and wherein the first current value is greater than 0; and
   when the second WLAN signal is a data frame, adjust the power consumption mode of the LNA based on the service type and the communication quality parameter of the second WLAN signal, wherein the communication quality parameter comprises an environment interference parameter and a signal quality parameter, wherein when the service type of the second WLAN signal is the high-priority service type, the environment interference parameter is less than a first threshold, and the signal quality parameter is greater than a second threshold, the processing circuit is configured to adjust the LNA to the low power consumption mode.

2. The apparatus according to claim 1, wherein the processing circuit is configured to:
   adjust at least one of a working current or a working voltage of the LNA based on the second WLAN signal.

3. The apparatus according to claim 1, wherein the processing circuit is configured to:
   when the second WLAN signal is a non-data frame, adjust the LNA to the low power consumption mode.

4. The apparatus according to claim 1, wherein the processing circuit is configured to:
   when the service type of the second WLAN signal is a low-priority service type and the communication quality parameter is less than a preset first threshold, adjust the LNA to the low power consumption mode.

5. The apparatus according to claim 4, wherein the communication quality parameter is an environment interference parameter.

6. The apparatus according to claim 1, wherein the processing circuit is configured to:
   when the service type of the second WLAN signal is a low-priority service type and the communication quality parameter is greater than a third threshold, adjust the LNA to the high power consumption mode.

7. The apparatus according to claim 6, wherein the communication quality parameter is an environment interference parameter.

8. The apparatus according to claim 1, wherein the processing circuit is configured to:
   when the service type of the second WLAN signal is the high-priority service type, an environment interference parameter is greater than a third threshold, and a signal quality parameter is less than a fourth threshold, adjust the LNA to the high power consumption mode, wherein the communication quality parameter comprises the environment interference parameter and the signal quality parameter.

9. The apparatus according to claim 1, wherein the second WLAN signal is a frame header of a signal frame, and wherein the radio frequency front-end module is further configured to:
   receive a third WLAN signal from the antenna, wherein the third WLAN signal is a frame body of the signal frame; and
   wherein the processing circuit is further configured to:
   receive the third WLAN signal after the gain amplification is performed by the LNA in the adjusted power consumption mode.

10. The apparatus according to claim 1, wherein the second WLAN signal is a signal frame obtained at a start moment of a first periodicity, and wherein the radio frequency front-end module is further configured to:
    receive a third WLAN signal from the antenna, wherein the third WLAN signal is another signal frame in the first periodicity; and
    wherein the processing circuit is further configured to:
    receive the third WLAN signal after the gain amplification is performed by the LNA in the adjusted power consumption mode.

11. The apparatus according to claim 9, wherein if the LNA is adjusted to the low power consumption mode, the processing circuit is further configured to:
    obtain a packet error rate and a throughput rate of the third WLAN signal based on a specified periodicity, and
    when the packet error rate is greater than a fifth threshold and the throughput rate is greater than a sixth threshold, adjust the LNA to a high power consumption mode.

12. A power consumption control method, comprising:
    receiving, by a processing circuit, a first wireless local area network (WLAN) signal after gain amplification is performed by a low noise amplifier (LNA) in a radio frequency front-end module; and adjusting, by the processing circuit, a power consumption mode of the LNA based on the first WLAN signal, wherein when a service type of the first WLAN signal is a high-priority service type, the processing circuit is configured to adjust the LNA to a low power consumption mode based on a communication quality parameter of the first WLAN signal, wherein the power consumption mode comprises the low power consumption mode or a high power consumption mode, wherein a working current of the LNA in the low power consumption mode is a first current value, wherein a working current of the LNA in the high power consumption mode is a second current value, wherein the first current value is less than the second current value, and wherein the first current value is greater than 0; and when the first WLAN signal is a non-data frame, adjusting the LNA to the low power consumption mode, wherein the communication quality parameter comprises an environment interference parameter and a signal quality parameter, wherein when the service type of the first WLAN signal is the high-priority service type, the environment interference parameter is less than a first threshold, and the signal quality parameter is greater than a second threshold, the processing circuit is configured to adjust the LNA to the low power consumption mode.

13. The method according to claim 12, wherein the adjusting the power consumption mode of the LNA based on the first WLAN signal comprises:

adjusting at least one of a working current or a working voltage of the LNA based on the first WLAN signal.

14. The method according to claim 12, wherein the adjusting the power consumption mode of the LNA based on the first WLAN signal comprises:

when the first WLAN signal is a non-data frame, adjusting the LNA to the low power consumption mode.

15. The method according to claim 12, wherein the adjusting the power consumption mode of the LNA based on the first WLAN signal comprises:

when the service type of the first WLAN signal is a low-priority service type and the communication quality parameter is less than a preset first threshold, adjusting the LNA to the low power consumption mode.

* * * * *